United States Patent
Jeromin et al.

(10) Patent No.: US 7,303,643 B2
(45) Date of Patent: Dec. 4, 2007

(54) TOUCHLESS TFT PANEL LAMINATION FIXTURE AND PROCESS

(75) Inventors: Lothar Jeromin, Landenberg, PA (US);
Allen L. Slayman, Elkton, MD (US);
Glenn E. Parker, Bear, DE (US)

(73) Assignee: Hologic, Inc., Bedford, MA (US)

( * ) Notice: Subject to any disclaimer, the term of this patent is extended or adjusted under 35 U.S.C. 154(b) by 527 days.

(21) Appl. No.: 10/996,505

(22) Filed: Nov. 24, 2004

(65) Prior Publication Data

US 2005/0115669 A1    Jun. 2, 2005

Related U.S. Application Data

(60) Provisional application No. 60/525,481, filed on Nov. 25, 2003.

(51) Int. Cl.
*B32B 37/10* (2006.01)
(52) U.S. Cl. ............ 156/286; 156/285; 156/295; 156/382; 156/275.7; 156/556
(58) Field of Classification Search .......... None
See application file for complete search history.

(56) References Cited

U.S. PATENT DOCUMENTS

| 6,971,428 B2 * | 12/2005 | Eichlseder .......... 156/382 |
| 7,165,875 B2 * | 1/2007 | Ohtomo et al. ....... 362/632 |
| 2005/0236105 A1 * | 10/2005 | Hasegawa et al. ..... 156/312 |
| 2006/0081332 A1 * | 4/2006 | Kang et al. .......... 156/285 |

FOREIGN PATENT DOCUMENTS

| JP | 2000-241804 | * | 9/2000 |
| JP | 2005-114965 A | * | 4/2005 |

* cited by examiner

*Primary Examiner*—Jessica Ward
(74) *Attorney, Agent, or Firm*—Cooper & Dunham LLP

(57) ABSTRACT

A method and apparatus for laminating a TFT panel with a glass support plate without the need to touch an active area of the TFT panel. To accomplish this result, a touchless vacuum lamination chuck secures the TFT panel by its outer margins that do not carry TFTs. To facilitate lamination of the TFT panel, a pressure chamber is formed within the laminating chuck to provide support to the center region of the TFT panel as it is brought into contact with the glass support plate.

5 Claims, 5 Drawing Sheets

3D Chest Wall View

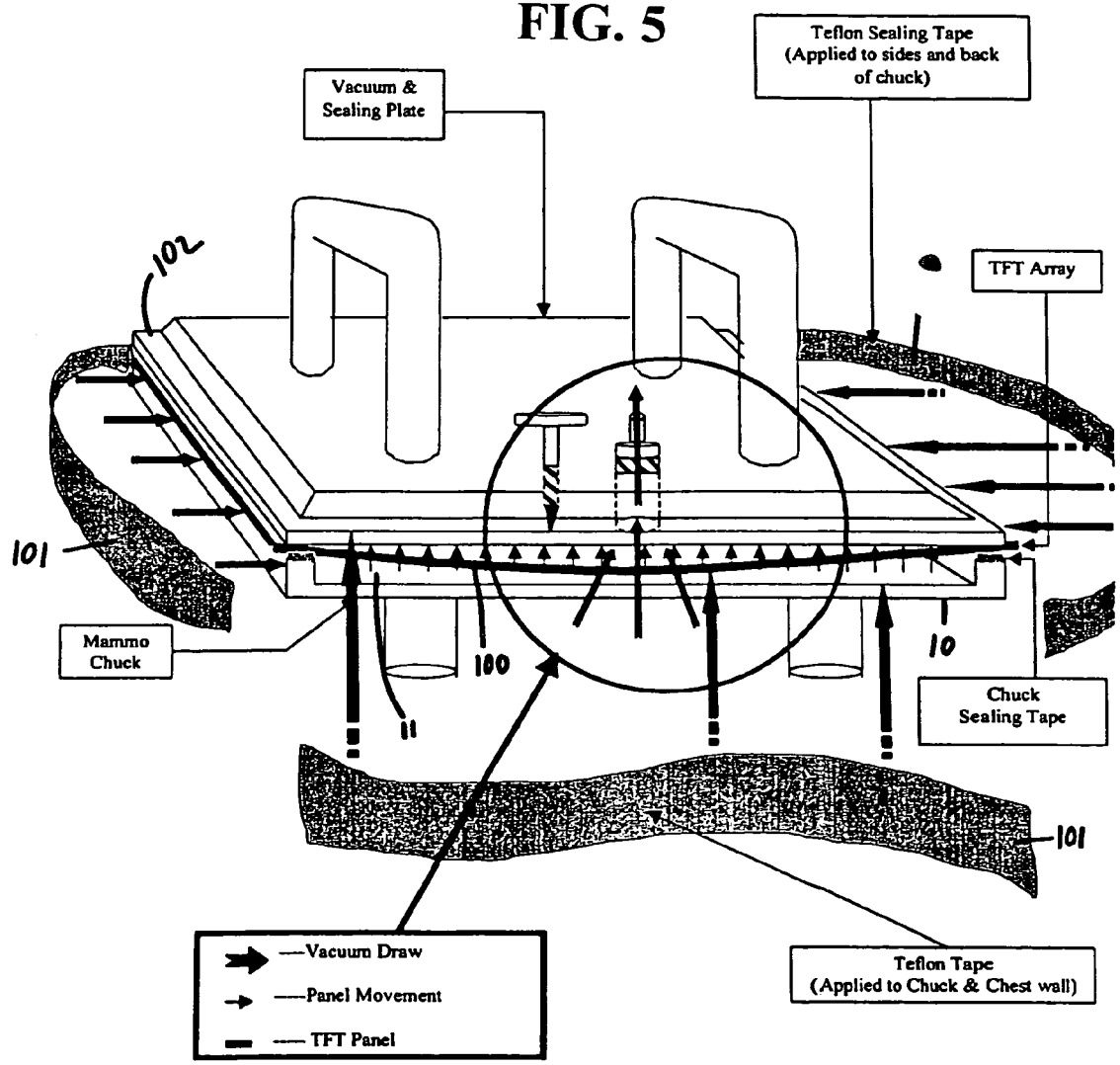
Fig. 5 3D Chest Wall View

TOUCHLESS TFT PANEL LAMINATION FIXTURE AND PROCESS

CROSS-REFERENCE TO RELATED APPLICATIONS

This application claims the benefit of commonly owned, co-pending provisional application Ser. No. 60/525,481, filed Nov. 25, 2003 and entitled "TOUCHLESS TFT PANEL LAMINATION FIXTURE AND PROCESS", the entire contents of which are incorporated by reference herein.

FIELD

This patent specification relates to laminating a TFT panel with a glass support plate. More particularly, this patent specification pertains to a method and apparatus for laminating a TFT panel with a glass support plate while refraining from making contact with any portion of the TFT panel's front face other than on peripheral strips that are free of TFTs.

BACKGROUND

Thin film transistor (TFT) panels are frequently fabricated on very thin substrates such as 0.7 mm thick glass panels. The back faces of the TFT panels, i.e. the sides opposite the front faces carrying the TFTs, are subsequently laminated onto glass support plates, commonly using a UV-curable resin, so that subsequent process steps can be performed without damaging or distorting the fragile TFT panels. This approach is well known in the art and is described in U.S. Pat. No. 5,827,757 issued Oct. 27, 1998 to Robinson, et al., which is hereby incorporated by reference. During this process, solid objects should not make contact with the front face of the TFT panel because burrs or dust particles found on solid objects can crush films on the TFT panel.

A previous approach for laminating a TFT panel onto a glass support plate involves holding the TFT panel using a vacuum chuck with a piece of lint-free paper forming a cushion between the chuck and the front face of the TFT panel to avoid having the metal chuck make direct contact with the front face of the TFT panel. Lint-free paper can be used as a cushion because it is both porous and cushioning. Panel laminated according to this approach are offered commercially in this country by the assignee hereof, and further information therein is available at its website, HOLOGIC.COM.

Artifacts can sometimes be found on images captured using TFT panels that have been manufactured using lint-free paper. These artifacts are a result of uneven curing of UV resin used in the TFT panels due to reflection of UV light from the lint-free free paper to the TFT panels. Lint-free paper can also leave small paper particle on the TFT panel that must subsequently be removed using a spin cleaning process. Spin cleaning can add cost and complexity to the TFT panel manufacturing process and can occasionally promote crazing of the TFT panel thereby lowering the manufacturing yield. The vacuum chuck used in this process does not shield the TFT panel from potentially harmful vapors that emanate from the UV-curable resin used to laminate the TFT panel to the glass support plate.

SUMMARY

An object of the disclosed system and method is to solve problems discussed above relating to laminating TFT panels onto glass support plates.

Specifically, an object is to provide a system and method for laminating TFT panels onto glass support plates without making contact with the front face of the TFT panel (the face carrying the TFTs) other than on peripheral strips that are free of TFTs. It is also an object to provide a system and method for laminating TFT arrays onto sturdy glass plates without the use of lint-free paper. It is also an object to reduce artifacts found on images captured using TFT panels relative to images captured from TFT panels manufactured using a previous approach involving lint-free paper. It is also an object to provide a system and method for laminating TFT panels onto glass support plates that may avoid the need for spin cleaning, shield the TFT panel from potentially harmful vapors that emanate from UV-curable resins used to laminate the TFT panel to the glass support plate, and reduce instances of crazing over TFT panels that have been laminated pursuant to the previous approach.

The disclosed system and method laminate TFT panels onto glass support plates without making contact with the front face of the TFT panel other than on peripheral strips that are free of TFTs, while reducing artifacts found on images captured using TFT panels, avoiding the need for spin cleaning, shielding the TFT panel from potentially harmful vapors that emanate from UV-curable resins, and reducing instances of crazing.

The disclosed system comprises a lamination chuck which contacts the TFT panel only on the peripheral strips. The TFT panel is oriented horizontally with the face to be laminated (the back face) facing up and the sensitive front face facing down. The TFT panel is supported by a cushion of gas, preferably dry nitrogen ($N_2$), to prevent the thin TFT panel from sagging under its own weight and to cause the TFT panel to bow up at the start of the lamination process. The gas is prevented from escaping by sealing the perimeter of the lamination chuck with sealing tape. The pressure within the cushion of gas is monitored by a manometer and regulated by a bleed valve, a gas inlet, and a pressure regulator. The peripheral strips are held to the chuck by vacuum channels that are built into the rim of the chuck. While the TFT panel is held firmly in place and bowed up, a UV-curable resin is applied to the TFT panel. The glass support plate is gradually brought into contact with the TFT panel as the pressure within the cushion of gas is reduced. The resin spreads out as the area of contact between the TFT panel and the glass support plate increases. After the TFT panel is flat against the glass support plate, the resin is cured.

BRIEF DESCRIPTION OF THE DRAWINGS

FIG. 5 illustrates a TFT panel being laminated in accordance with a preferred embodiment.

DESCRIPTION OF PREFERRED EMBODIMENTS

Figures 1A, 1B:
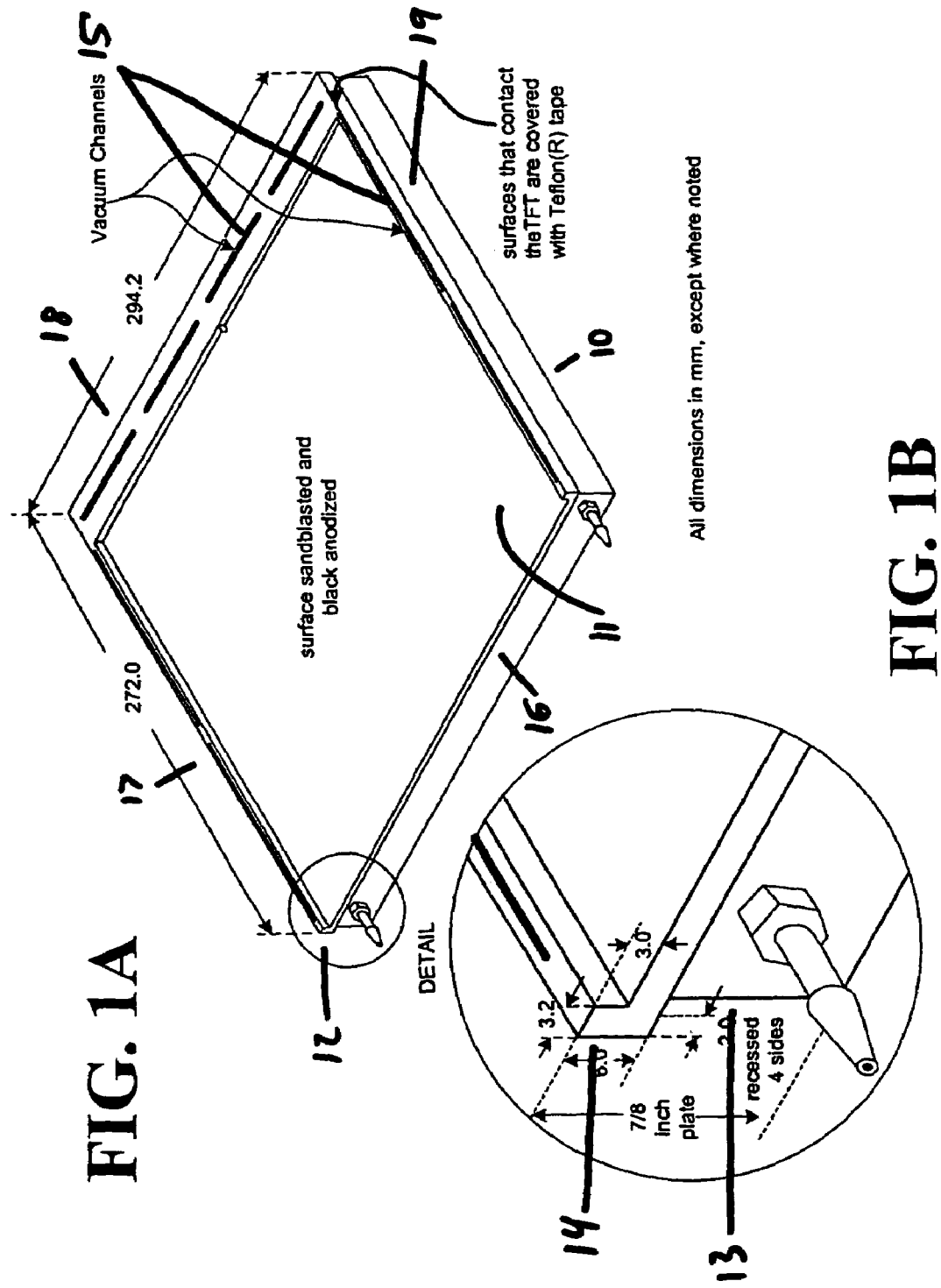
FIGS. 1a and 1b illustrate a laminating chuck in accordance with a preferred embodiment.

FIGS. 1a and 1b illustrate a lamination chuck 10 machined out of a cast aluminum plate to maintain its flatness and dimensional stability. The top surface of the chuck 10 is machined into a 3 mm deep tray or pressure chamber cavity 11, which is slightly larger in length and width than the active area of a TFT panel, thereby forming a ridge 12 on a second edge 17 of the chuck 10, third edge 18 of the chuck 10, and fourth edge 19 of the chuck 10, leaving the first edge 16 of the chuck 10 without a ridge. No ridge is formed on the first edge 16 of the chuck 10 because the TFT panel 100 (see FIG. 5) preferably has active elements extending all the way to the first edge of the panel (the chest wall edge). Sealing tape (not shown) is affixed to the ridge 12 to help maintain desired pressure. The side walls 13 of the chuck 10 are recessed to form a shoulder 14 on all four sides, onto which an adhesive tape drip skirt (not shown) is attached. The drip skirt is used to help catch excess UV-curable resin that escapes from the sides of the chuck 10 during lamination. Vacuum channels 15 are machined into all three sides of the ridge 12 so that the TFT panel can be held firmly in place by three of its edges.

Figure 2:
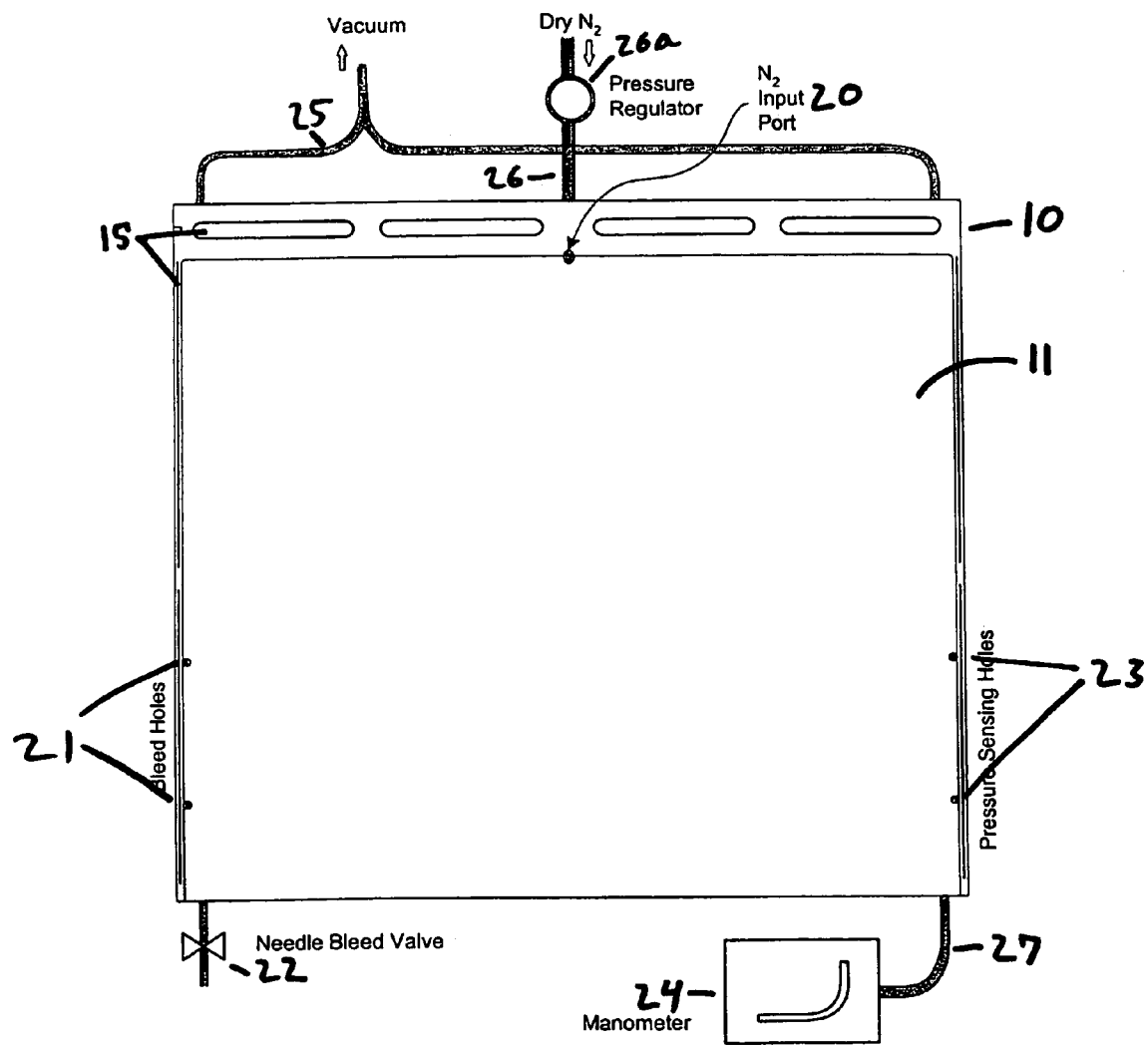
FIG. 2 is a plan view of the laminating chuck shown in FIG. 1 detailing the chuck's gas connections and instrumentation.

FIG. 2 illustrates the lamination chuck 10 in plan view. An input port 20 leads to a recess 11 that serves as a pressure chamber during the lamination process. $N_2$ gas enters the input port 20 through a pressure hose 26 and pressure regulator 26a. Two bleed holes 21 allow excess gas to escape through a needle bleed valve 22, and two pressure sensing holes 23 allow the pressure inside the pressure chamber 11 to be monitored by a manometer 24. A second pressure hose 27 connects the manometer 24 to the pressure sensing holes 23. Suction is applied to the vacuum channels 15 by a vacuum connection hose 25 leading to a vacuum pump (not shown), which may be of the type used for vacuum chucks using lint-free paper.

Preferably, the holes 21, 23 are positioned as close to the ridge 12 as practical to avoid uneven reflection of UV radiation that is used for curing the UV-curable resin. Preferably, the pressure chamber 11 is sandblasted and the entire chuck 10 is anodized black to minimize reflection of the UV radiation that may cause exposure intensity variations. Preferably, all four sides of the chuck 10 are covered with a Teflon tape 101 (FIG. 6) to avoid scratching the TFT panel, and in particular, bonding pads and pad routing lines on the TFT panel's peripheral strips.

Figure 3A:
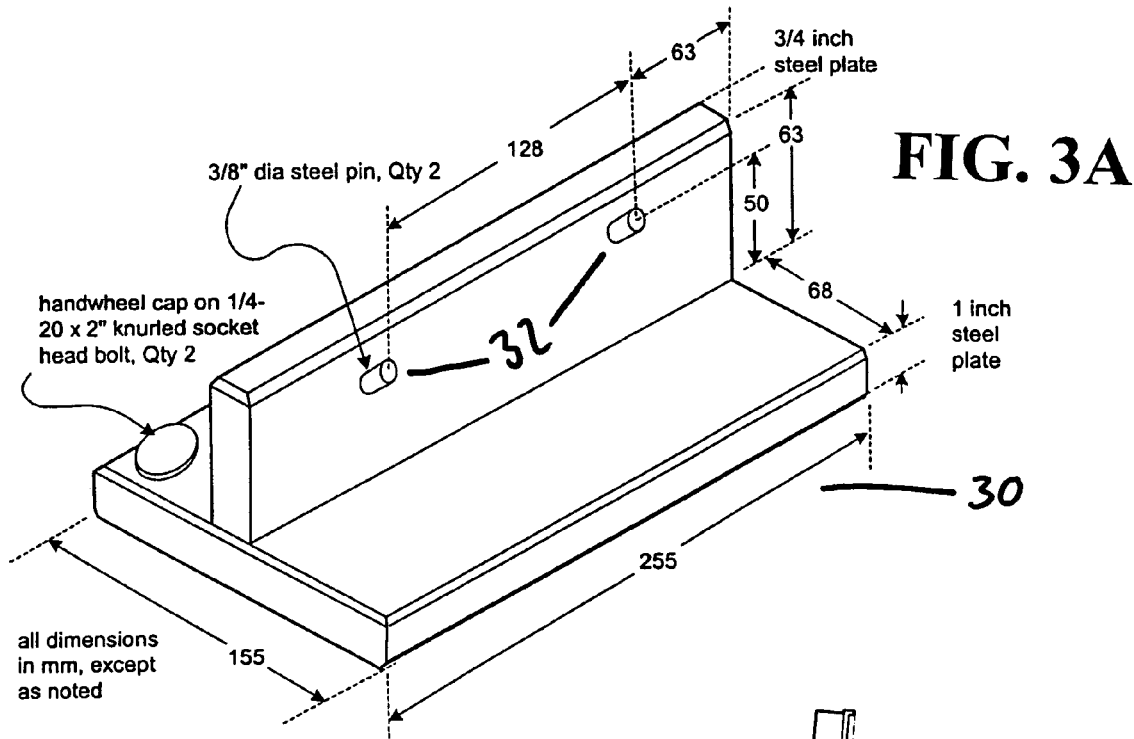
FIGS. 3a and 3b illustrate a sealing cover in accordance with a preferred embodiment.
Figure 3B:
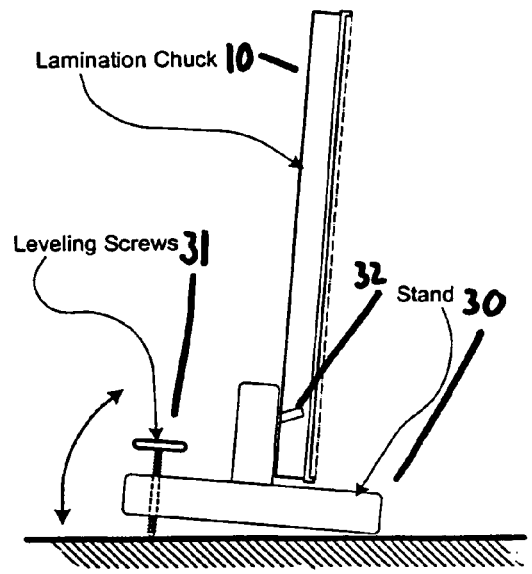
Figure 4A:
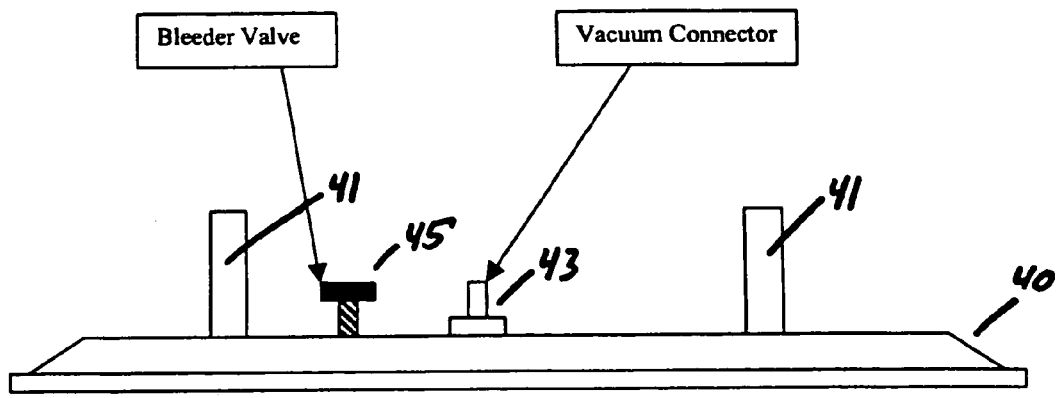
FIGS. 4a and 4b illustrate another view of the sealing cover shown in FIG. 4.
Figure 4B:
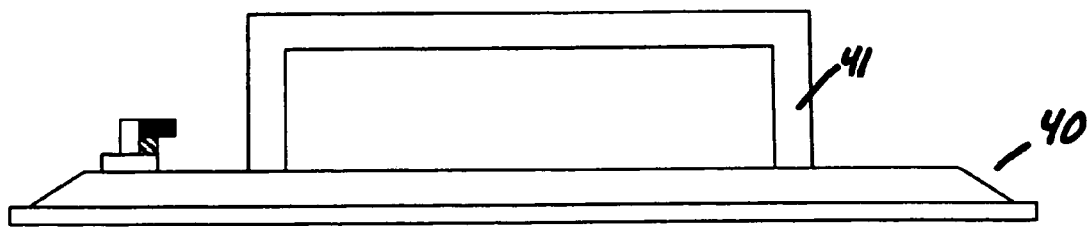

FIGS. 3a and 3b illustrate a vacuum sealing cover 40 that is used to prevent the TFT panel 100 from sagging while on the chuck 10. Two handles 41 are mounted on the top side of the sealing cover 40. A sealing cover vacuum channel 42 is formed at the underside of the sealing cover 40. This sealing cover vacuum channel 42 is connected to a vacuum port 43 positioned at the top side of the sealing cover 40, and the vacuum port 43 is connected to a vacuum pump (not shown). Suction may then be applied through the sealing cover vacuum channel 42 to allow the sealing cover 40 to hold the TFT panel 100 straight and prevent it from sagging down. A bleeder valve port 44 located on the underside of the sealing cover 40 is connected to a bleeder valve knob 45 on the top side of the sealing cover 40 to regulate suction within the sealing cover vacuum channel 42. Sealing tape 46 is affixed around the vacuum channel 42 and around the edges of the underside of the sealing cover 40 to help maintain the desired suction. FIGS. 4a and 4b also illustrate the sealing cover 42 of FIG. 3.

The chuck 10, the glass support plate and a UV-curable resin are preheated to 50° C. to reduce the viscosity of the resin. The chuck 10 is preferably heated with a resistance element (chuck heater)(not shown) and a thermocouple (not shown) is used to monitor the temperature of the chuck 10. The glass support plate and the resin are preferably heated in a convection oven.

As illustrated in FIG. 5, the TFT panel 100 is positioned on the chuck 10 with the back face (the face to be laminated) up and the front face (the face carrying the TFTs) down. Locating pins (not shown) are used to precisely align the TFT panel 100 on the chuck 10. The vacuum hoses 25 (FIG. 2) are connected and the vacuum pump is turned on. The drip skirt (not shown) is applied to the second edge 17, third edge 18, and fourth edge 19 of the chuck 10 (FIG. 1). The sealing cover 40 is placed on top of the TFT panel 100 with the vacuum channel 42 near the chest wall edge of the TFT panel 100. Vacuum is applied to the channel 42 to straighten the TFT panel 100 so the drip skirt can be applied to the panel while the panel is straight. The pressure is regulated, preferably to a pressure of 1.2 inch water column (WC). The bleed valve 22 is partly opened to stabilize the pressure and to allow for pressure reduction later. At a pressure of 1.2 inch WC the TFT panel 100 bows up and out to form a dome that is approximately 1 mm high in the center. The resin is poured onto the glass support plate 102 or on the bottom face of the TFT panel 100, preferably in a dog-bone shape or an oval shape puddle, with the long axis of the puddle parallel to the longer dimension of the glass support plate 102. The glass support plate 102 is then guided by locating pins (not shown) onto the TFT panel 100 where it is let stand for a length of time, preferably five minutes. In this position, initially only the center of the TFT panel 100 makes contact with the glass support plate 102 causing the excess resin to be squeezed away from the center. Over another length of time, also preferably five minutes, the pressure in the pressure chamber 11 is reduced linearly from 1.2 inch WC to 0.3 inch WC. As the pressure is reduced, the dome flattens out and the excess resin is squeezed out into the drip skirt (not shown). At 0.3 inch WC, the TFT panel 100 is planar. This technique helps to minimize the occurrence of air-bubbles in the resin. Over a settling time, preferably five minutes, potential variations in resin thickness will smooth out. The resin is UV cured with light from a UV source (not shown), preferably for 240 seconds, a shorter length of time than that which is required for the previous method of manufacture.

What is claimed is:

1. A method of laminating a relatively thick glass support plate to a relatively thin, rectangular TFT panel, said panel having a front face carrying thin film transistors (TFTs) associated with respective pixel positions over an area that stops short of extending to the edge of the panel on at least 3 edges leaving at least 3 respective peripheral strips of the front face of the panel that are free of TFTs, comprising:
    supporting the TFT panel over a cavity in a lamination chuck making physical contact with said peripheral strips of the panel and holding said peripheral strips to the chuck by vacuum suction, positioning the front face of the panel to face the cavity and having a back face of the panel facing away from the cavity;
    applying fluid pressure to the cavity, supporting a central portion of the TFT panel so the TFT panel does not bow in toward the cavity;
    uniformly applying a UV-curable resin between a front face of the glass support plate and the back face of the TFT panel;

gradually moving the glass support plate and the TFT panel toward each other until the back face of the panel is laminated to the front face of the plate, with said UV-curable resin between the panel and plate; and curing the resin with UV light to complete the lamination.

2. The method of laminating a relatively thick glass support plate to a relatively thin, rectangular TFT panel as in claim 1, wherein said applied fluid pressure is gas pressure.

3. The method of laminating a relatively thick glass support plate to a relatively thin, rectangular TFT panel as in claim 1, wherein said UV curable resin between the panel and the plate has a uniform thickness and is free of bubbles.

4. A method of laminating a relatively thick glass support plate to a relatively thin, rectangular TFT panel, said panel having a front face carrying thin film transistors (TFTs) associated with respective pixel positions over an area that stops short of extending to the edge of the panel on at least 3 edges to thereby leave at least 3 respective peripheral strips of the front face of the panel that are free of TFTs, comprising:

supporting the TFT panel over a cavity in a lamination chuck that makes physical contact with said peripheral strips of the panel and holds said peripheral strips to the chuck by vacuum suction, with the front face of the panel facing the cavity and a back face of the panel facing away from the cavity;

applying fluid pressure to the cavity to force a central portion of the TFT panel to bow out, away from the cavity;

applying UV-curable resin to at least a central portion of at least one of the glass support plate and the TFT panel;

gradually moving the glass support plate and the TFT panel towards each other to initially cause only central areas thereof, at least one of which has said resin thereon, to make contact with the resin and each other and thereafter to gradually spread the resin between the plate and the panel while increasing the area over which resin covered surfaces of the plate and panel make contact, and gradually reducing the gas pressure in the cavity, until the entire back face of the panel is laminated to the plate, with a layer of resin between the panel and plate; and curing the resin with UV light to complete the lamination.

5. The method of laminating a relatively thick glass support plate to a relatively thin, rectangular TFT panel as in claim 1, wherein said applied fluid pressure is gas pressure.

* * * * *